United States Patent
Ziolkowski (10) Patent No.: US 6,799,769 B2
(45) Date of Patent: Oct. 5, 2004

(54) WELDING CYLINDER DOLLY

(75) Inventor: Stephen Ziolkowski, Glendora, CA (US)

(73) Assignee: Z Manufacturing, La Verne, CA (US)

( * ) Notice: Subject to any disclaimer, the term of this patent is extended or adjusted under 35 U.S.C. 154(b) by 0 days.

(21) Appl. No.: 10/382,806

(22) Filed: Mar. 6, 2003

(65) Prior Publication Data

US 2003/0141685 A1 Jul. 31, 2003

Related U.S. Application Data

(63) Continuation of application No. 09/792,542, filed on Feb. 23, 2001, now Pat. No. 6,554,300.

(51) Int. Cl.⁷ .................................................. B62B 1/00
(52) U.S. Cl. ...................... 280/47.27; 414/448; 414/490
(58) Field of Search ........................... 280/43.1, 43.11, 280/43.12, 47.27, 47.131; 414/444, 448, 449, 490; 254/209; 294/31.2; 224/42.39

(56) References Cited

U.S. PATENT DOCUMENTS

| | | | |
|---|---|---|---|
| 255,797 A | | 4/1882 | Knudseni |
| 641,594 A | | 1/1900 | Hartwich |
| 879,914 A | * | 2/1908 | Schriver et al. ............. 414/448 |
| 957,840 A | | 5/1910 | Bjorklund |
| 1,300,567 A | * | 4/1919 | Broby ......................... 414/448 |
| 1,379,472 A | * | 5/1921 | Morgan et al. .............. 414/448 |
| 1,429,432 A | * | 9/1922 | Irrgang ........................ 414/448 |
| 1,694,343 A | | 12/1928 | Klein |
| 1,772,951 A | | 4/1930 | Klein |
| 2,477,294 A | | 7/1949 | Fuller |
| 2,616,720 A | * | 11/1952 | Knoth ......................... 280/43.1 |
| 2,654,493 A | | 10/1953 | Kernkamp |
| 2,661,982 A | | 12/1953 | Hudson |
| 2,778,515 A | * | 1/1957 | Hanson .................... 280/47.27 |
| 2,820,643 A | * | 1/1958 | Cohn ....................... 280/47.27 |
| 2,838,190 A | * | 6/1958 | Stevens .................... 280/47.27 |
| 2,842,274 A | * | 7/1958 | Sherman ..................... 414/448 |
| 3,075,662 A | * | 1/1963 | Da Prato et al. ......... 280/47.27 |
| 3,272,529 A | * | 9/1966 | Rachman ............... 280/47.131 |
| 4,116,374 A | * | 9/1978 | Garello .................... 224/42.39 |
| 4,185,853 A | | 1/1980 | Thurmond |
| 4,205,937 A | | 6/1980 | Fawley |

(List continued on next page.)

OTHER PUBLICATIONS

Harper, World Leader, pp. 1–20, 25–33, 38–44 (steel trucks catalog)—Catalog No. 190—not dated.
Harper, Welding Cylinder Trucks—Catalog No. W–9 (entire catalog) Nov. 1990.
Anthony Welded Products, Inc.—Medical Products Division Catalog (entire catalog) 1996.
Anthony Welded Products, Inc.—Catalog No. A–100, pp. 3–11, 14–15, 23. 1994.

Primary Examiner—Brian L. Johnson
Assistant Examiner—Christopher Bottorff
(74) Attorney, Agent, or Firm—Fulwider Patton Lee Utecht, LLP (57) ABSTRACT

A wheeled hand dolly for loading, unloading, and transporting cylindrical objects from one location to another including a pair of vertical support members cooperating to form a forwardly facing contact area and joined by a cross member having a recessed portion. An adjustable restraining strap includes a free end with an attachment member and an opposing anchor end for attachment to either side of said cross member to substantially encircle the cylindrical object and having a second contact area to sandwich the cylindrical object between the contact surfaces and frictionally retain it thereto such that the object may be transported along with the dolly.

19 Claims, 9 Drawing Sheets

U.S. PATENT DOCUMENTS

| | | | | |
|---|---|---|---|---|
| 4,793,623 A | * | 12/1988 | Talbot | 280/47.27 |
| 4,902,187 A | * | 2/1990 | Rousseau | 280/47.27 |
| 5,549,318 A | * | 8/1996 | Ho | 280/47.27 |
| 5,624,224 A | * | 4/1997 | Brandenburg | 280/47.27 |
| 5,658,118 A | * | 8/1997 | Luca | 414/444 |
| 5,988,669 A | * | 11/1999 | Freese et al. | 280/642 |
| 6,357,063 B1 | * | 3/2002 | Selby | 280/47.131 |
| 6,554,300 B1 | * | 4/2003 | Ziolkowski | 280/47.27 |

* cited by examiner

WELDING CYLINDER DOLLY

This application is a continuation of U.S. Ser. No. 09/792,542, filed on Feb. 23, 2001, now U.S. Pat. No. 6,554,300, which in turn a continuation-in-part of U.S. Pat. No. D455,882, entitled Welding Cylinder Dolly, filed on Feb. 22, 2001 both of which are incorporated herein by reference in their entirety.

BACKGROUND OF THE INVENTION

1. Field of the Invention

The invention relates generally to wheeled hand dollies and more specifically relates to a wheeled dolly for transporting cylindrical objects.

2. Description of the Prior Art

Wheeled carts such as the wheelbarrow have been a staple of transporting goods for centuries. The convenience of being able to carry a greater load with much less effort has made wheeled carts commonplace and such carts are deemed highly useful in transporting selected goods. A variety of cart configurations such as shopping carts, golf handcarts, and personal luggage carts are commonly used in today's society. Such carts are typically configured to transport a certain type of good or group of goods. For instance, it is common to move furniture or heavy appliances with a furniture dolly. A typical furniture dolly for example includes a rectangular frame supporting a set of wheels and a lower noseplate which slides underneath the appliance to be lifted to support it from below. Thus, all or most of the weight is supported on the noseplate and some is transferred to the frame as the dolly is tilted backward. Often the handler will secure the appliance to the dolly using a rope or strap that is tied to the frame of the dolly. However, the incorporation of this noseplate often causes damage to the surface below the appliance or interferes with the loading or unloading of the item being transported. Thus, there have developed a number of attempts to provide a wheeled hand dolly eliminating the use of the noseplate.

One such attempt can be found in U.S. Pat. No. 1,429,432 to Irrgang. The hand truck disclosed in Irrgang includes a flexible band used to secure a cylinder to a rectangular frame having a series of cross members acting as frictional members and therefore must conform to the surface of the cylinder to optimize frictional resistance. Thus, the truck is likely to be limited in use to a particular size cylinder.

Another example is shown in U.S. Pat. No. 2,477,294 to Fuller. The Fuller hand truck relies on a circular hinged band carried from a rectangular frame to secure an article such as an oxygen bottle. The band dimensions are substantially fixed however, and would not support a wide range of cylinder diameters.

Yet another proposed configuration can be found in U.S. Pat. No. 2,654,493 to Kernkamp which describes an oxygen tank truck consisting of a frame having vertical side bars and a top mounted handle bar with a tank receiving saddle secured to the lower ends of the bars. A clamp including front and rear jaws is carried by the side bars and is positioned to encircle the upper portion of the tank. The truck is mounted on a tricycle platform with a rear foldable bracket supporting the third wheel. As in the Fuller device, the clamp has fixed dimensions and could not accommodate a variety of cylindrical configurations.

Another dolly configuration is described in U.S. Pat. No. 4,205,937 to Fawley. The Fawley carrier includes a hook for insertion under a gas cylinder having a top portion configured to receive such hook to support its weight and thus is limited to a particular type of cylindrical configuration.

A barrel truck is shown and described in U.S. Pat. No. 879,914 to Schriver. Schriver discloses a barrel truck which includes a frame and a chain used in conjunction with a pair of forwardly extending feet to support the weight of a barrel. Thus, the feet may interfere with the placement of the barrel or damage and underlying surface. The use of the chain may facilitate slippage of the barrel if transported over an uneven surface.

As is apparent from these references, a common shortcoming running through all these prior cart designs is the absence of a cart frame that includes an adjustable restraining means and a frame that can accommodate a variety of cylindrical dimensions and frictionally retain the cylinder thereto without the need of a noseplate.

What is needed is a convenient wheeled dolly, formed with a durable rigid frame for transporting cylindrical objects of a variety of cylindrical dimensions without interfering with the loading and unloading thereof.

SUMMARY OF THE INVENTION

In accordance with a preferred embodiment of the present invention, a wheeled dolly is provided for loading, unloading, and transporting cylindrical objects to alternate locations. The dolly includes, generally, a pair of spaced apart vertical support members forming a contact support surface and joined at an intermediate section by a cross member. An adjustable restraining strap is secured to one end of the cross member and includes a free end with an attachment member such that the strap may encircle the cylindrical object and be fastened to the opposing end of the cross member and tightened. The strap includes an interior surface forming a second contact surface and when tightened sandwiches the cylinder between said contact surfaces to frictionally retain the cylinder to the dolly during transport.

Another feature of the present invention is the incorporation of a pair of fail-safe feet which project from the lower ends of the vertical support members to support the bottom of the cylinder without interfering with the loading or unloading of the cylindrical object.

Yet another feature of the present invention is the use of a cross member having a plurality of spaced apart holes for receipt of a hook attached to the free end of the strap for accommodating cylinders of varying diameters.

Numerous advantages and aspects of the invention will be apparent to those skilled in the art upon consideration of the following detailed description taken in conjunction with the drawings which generally provide illustrations of the invention in its presently preferred embodiments.

DETAILED DESCRIPTION OF THE PREFERRED EMBODIMENT

Referring now to FIGS. 1–2, 3A, 3B and 5–6, a two-wheeled, dolly, generally designated 10, is provided for loading, unloading, and transporting cylindrical objects 12 such as welding cylinders to and from a location such as a welding cart 13 or a storage location. While the invention will be described in connection with the transportation of gas cylinders used in the welding industry, it is understood that the invention is not to be limited in scope to transporting such objects, but may be used with objects having other configurations. The dolly includes a frame formed of first and second spaced apart vertical support members 14a and 14b arranged in a parallel relationship. Each vertical support member has an intermediate section 20a and 20b cooperating to form a contact support surface. A lower cross member 24 joins the first and second vertical support members together to form a support backing for accommodating cylinders of various dimensions and support their weight therefrom during transportation. The lower cross member 24 includes a central region 19 positioned rearwardly from the vertical support members such that the cylinder does not abut the central region 19 when the cylinder is loaded on the dolly 10. An adjustable restraining strap 26 is further provided for encircling and securing the cylinder to the dolly. One end of the strap 26 is connected to an anchor bracket assembly 59. The opposing end of the strap 26 includes means for engaging cross member 24. When tightened, the strap provides a second contact surface on its interior surface 27 to sandwich the cylinder between the three contact surfaces 20a, 20b and 27 to frictionally retain the cylinder on the dolly as it is being transported. A pair of wheels 50a and 50b are supported from the bottom of the vertical support members 14a and 14b so that the dolly may be tilted backward and wheeled from location to location.

The vertical support members 14a and 14b are formed of tubular metal such as steel and dimensioned to provide a support backing for cylindrical objects ranging in height of up to seven feet. Each vertical support member 14a and 14b includes a top end 32a, 32b, an intermediate section 20a, 20b, which is preferably substantially coextensive with said vertical support member 14a, 14b, and a bottom end 34a, 34b. The length of the intermediate sections is preferably 36 to 48 inches to accommodate a variety of cylindrical objects. It will be appreciated that the dolly could be constructed with a size more closely approximating the cylinder to be transported. For example, the dolly would not have to be as tall for transporting scuba tanks or fifty-five gallon drums as opposed to transporting 330 cubic foot gas cylinders. The intermediate sections form the main support contact surface providing a frictional surface to assist in supporting the cylindrical object during transportation. It will be appreciated that although the frictional surface is preferably coextensive with the intermediate sections 20a, 20b, it could be considerably shorter in height than the intermediate sections as long as sufficient frictional contact surface is provided to cooperate with the restraining strap to frictionally retain the cylinder on the dolly 10 during transportation.

Figure 1:
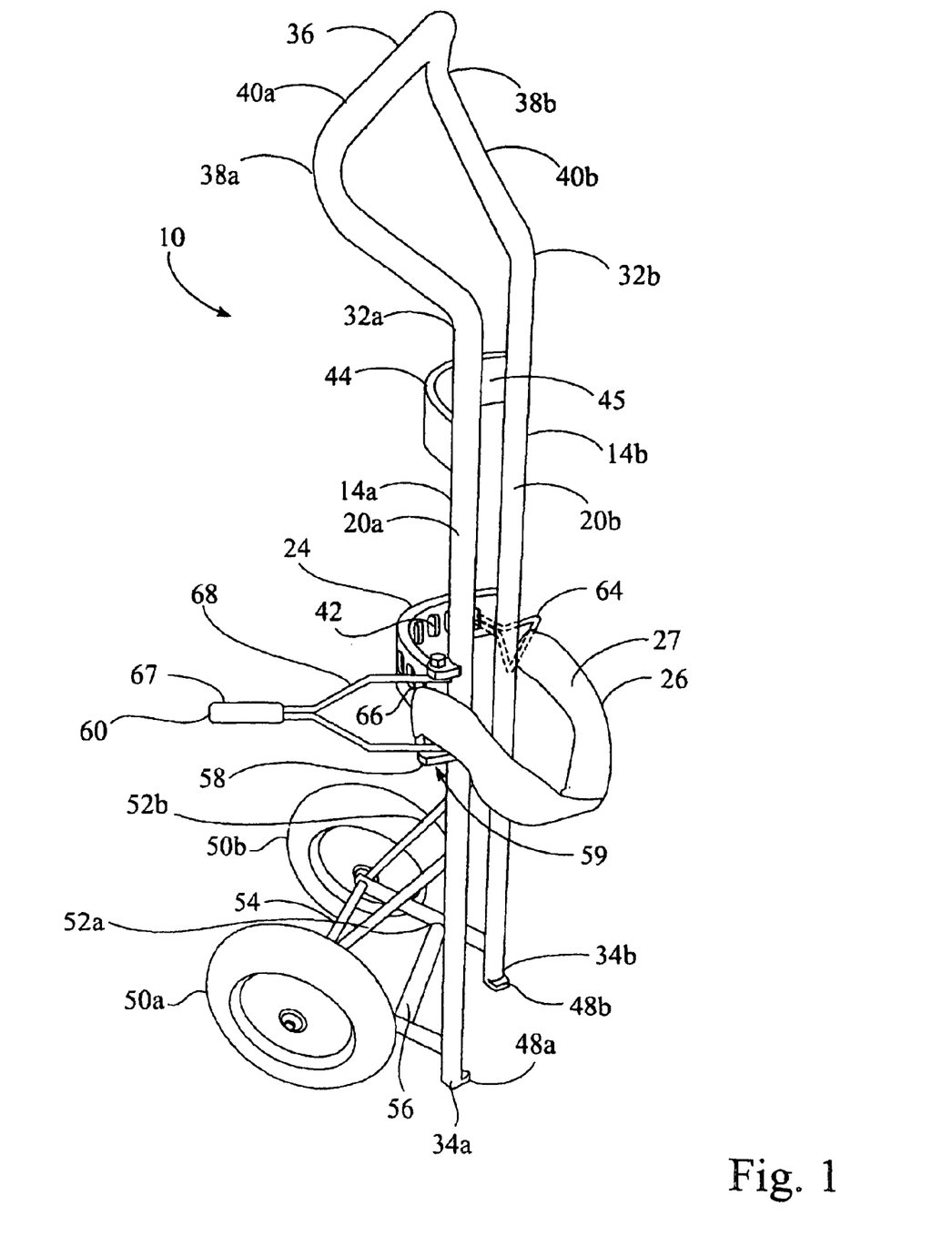
FIG. 1 is a perspective view of a welding cylinder dolly embodying the present invention.
Figure 2:
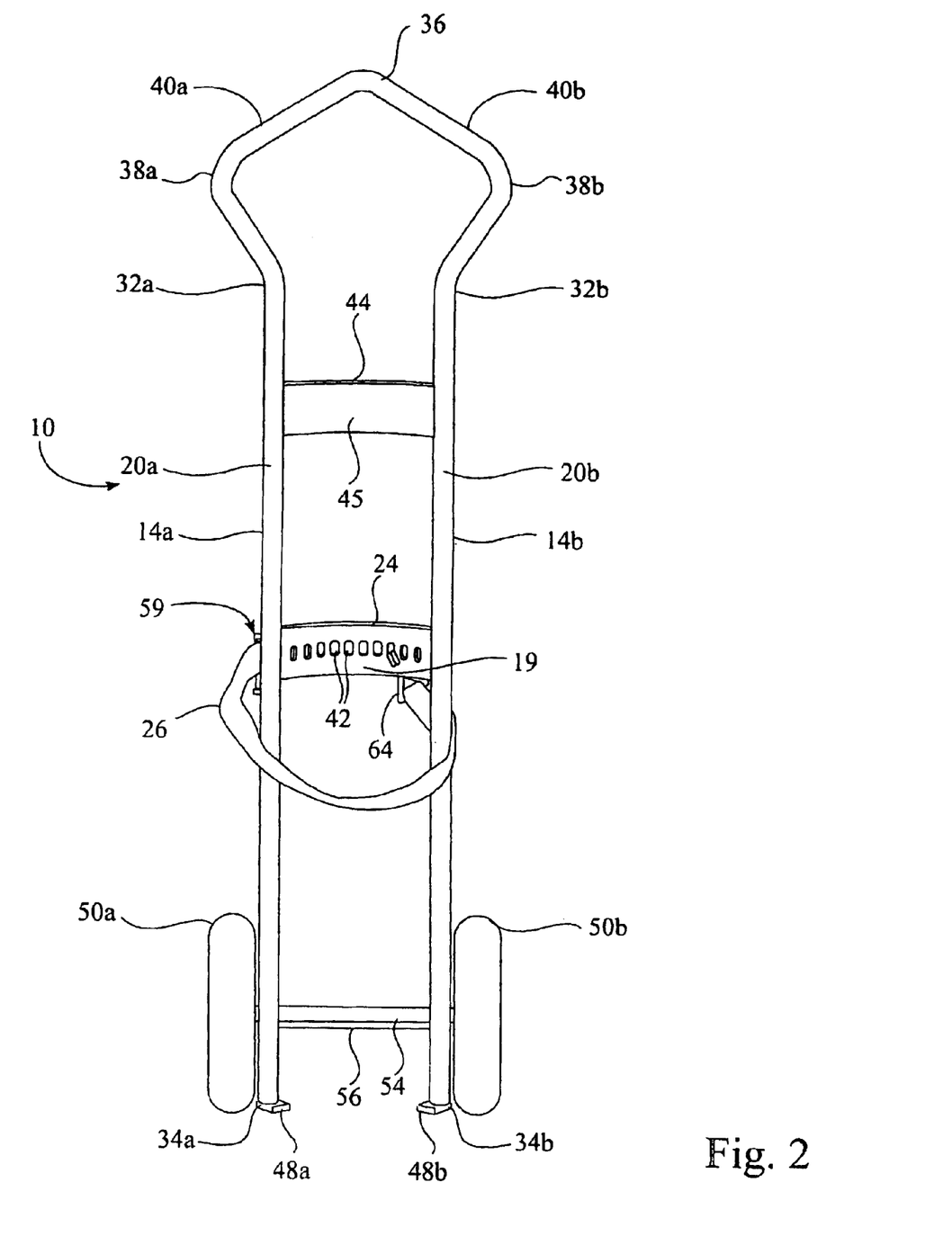
FIG. 2 is a front view, in reduced scale, of the embodiment shown in FIG. 1.
Figures 3A, 3B:
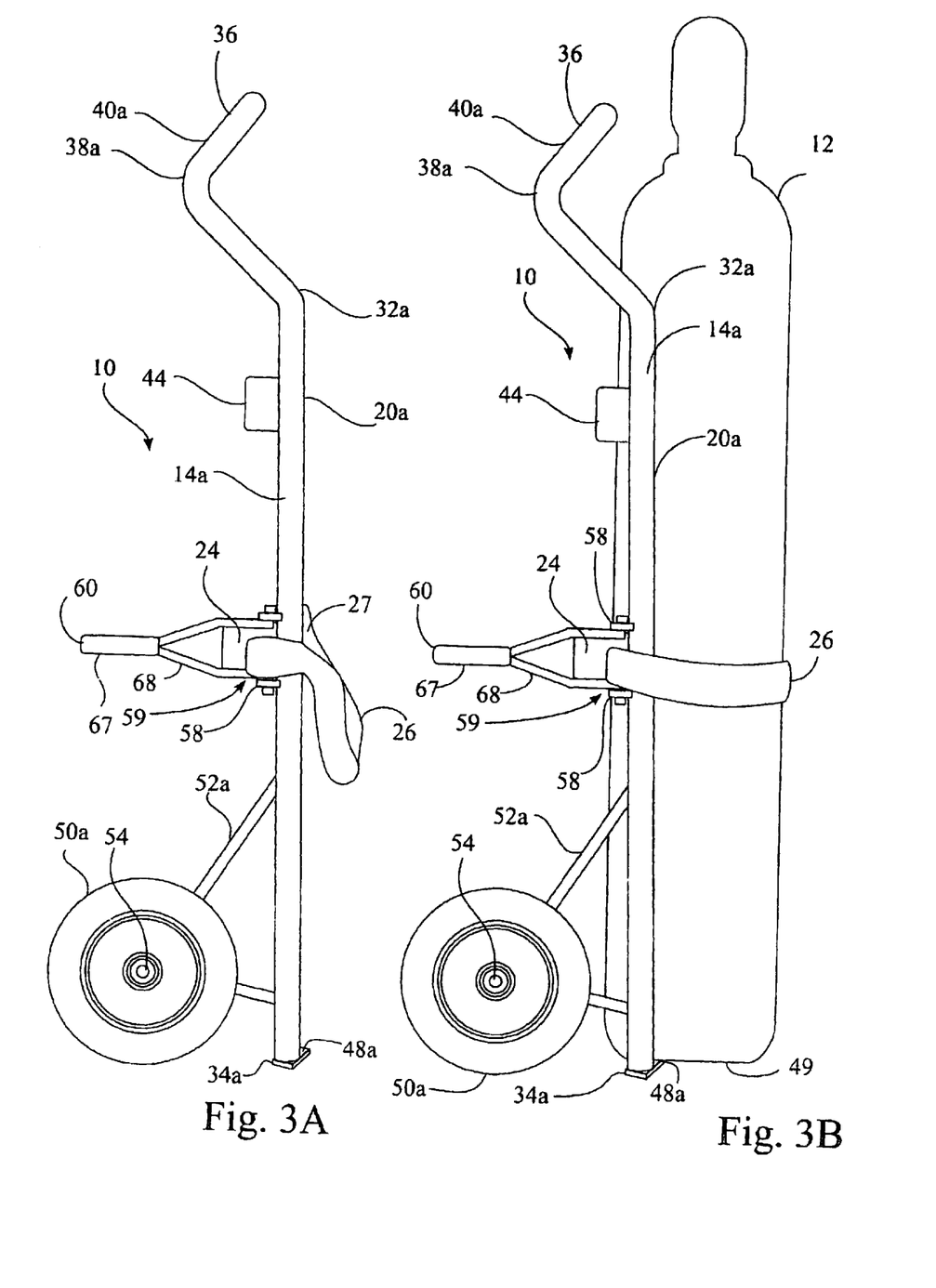
FIG. 3A is a side view of the embodiment depicted in FIG. 1.
FIG. 3B is a same view as depicted in FIG. 3A with the addition of a loaded cylindrical object.

Referring now to FIGS. 1–2, a pull handle 36 projects rearwardly from the respective top ends 32a, 32b of the vertical support members 14a, 14b. Such handle initially projects rearwardly and then curves forwardly at an intermediate point to form respective elbows 38a. 38b. The forward most edge of the handle is spaced behind a plane passing through the vertical support members providing sufficient clearance even for objects having non-conventional tops. As viewed from the front in FIG. 2, the handle 36 also flares outwardly from the top ends of each vertical support and then turns inwardly and upwardly at the elbow 38a, 38b to converge at a central point forming a pair of handle wings 40a, 40b. Conveniently, this handle configuration provides a number of different gripping points to address loading and unloading situations commonly encountered when transporting gas cylinders or the like. It will be appreciated that such handle configuration facilitates the handler gripping the dolly handle 36 from the sides, the back, or the front to maneuver the dolly and cylinder. For example, the handler could grip both wings 40a, 40b either above or below the respective elbow 38a, 38b or alternatively the handler could grip one wing both above and below the elbow 38a, 38b. The handle 36 and vertical support members 14a, 14b are preferably formed of a one piece tubing which is bent to form the desired configuration. The handle 36 and vertical support members 14a, 14b are then coated with powder coat which provides a durable surface having a coefficient of friction sufficient to retain the cylinder in a fixed upright or tilted position on the dolly when used in conjunction with the restraining strap 26. In a preferred embodiment utilized for transporting welding gas bottles, the dolly measures approximately 52 inches from top to bottom including the handle. The widest point of the dolly at the elbows 38a, 38b is 14 inches.

While the pulling handle 36 provides some rigidity to the dolly, the semi-cylindrically shaped, lower cross member 24 is welded to each of the vertical support members 14a, 14b within the intermediate sections 20a, 20b to add additional rigidity to the frame. The lower cross member includes a central region 19 that is recessed rearwardly from a plane passing through the vertical support members to provide a clearance gap between the cross member and the cylindrical object as will be further explained below. The cross member is selected to maintain the spacing between the vertical support members at seven inches off their respective center lines. In a preferred embodiment, the lower cross member further includes a set of eleven holes 42 which are spaced three-quarters of an inch apart off center and the outermost holes are spaced inwardly one inch off center from their respective proximate vertical support members 14a, 14b. This plurality of holes provides a means for accommodating a number of different sized or dimensioned cylindrical objects such as those typically encountered in industry including welding cylinders or other compressible gas containers ranging in size from 100 cubic feet to 330 cubic feet. Thus the dolly may be utilized in connection with a large range of cylinders considered portable in the industry using only a hand cart.

An upper cross member 44 is welded to the vertical support members 14a, 14b at a point within the intermediate sections 20a, 20b and above the lower cross member 24. The semi-cylindrical upper cross member is slightly smaller in circumference than the lower cross member but also includes a recessed section 45 to provide a clearance gap between the upper cross member and a seated cylindrical object 12.

At the bottom ends 34a, 34b of the vertical support members 14a, 14b are a pair of fail-safe flanges 48a, 48b or feet which project at right angles to the bottom edge of the vertical support members and also project inwardly and forwardly of a plane passing through the vertical support members. In other words, the flanges are positioned to engage the bottom edge 49 of the cylindrical object. These feet may be used to provide additional support for the weight of the cylinder and are conveniently dimensioned so as not to interfere with the loading and unloading of a cylinder. However, it has been found that the frictional force provided by the tightened strap 26 and the vertical support members 14a, 14b is sufficient in most situations to carry the weight of the cylinder and thus the feet are optional but may used to promote additional safety.

The dolly 10 is conveniently mounted on a pair of wheels 50a, 50b carried from a set of brackets 52a, 52b, each bracket being triangularly shaped and extending rearwardly from the respective vertical support members 14a, 14b. At the rearmost extreme, the brackets rotatably carry an axle 54 mounted through an axle sleeve with each wheel mounted on opposing ends of the axle. An axle mount cross bracket 56 is welded between the two brackets 52a, 52b for additional structural rigidity. The wheels are positioned behind the vertical support members facilitating a rearward pivoting maneuver to lift the cylinder clear of the underlying transport surface. The wheels may be formed with a rubber tire or of a hard plastic material.

Figure 4:
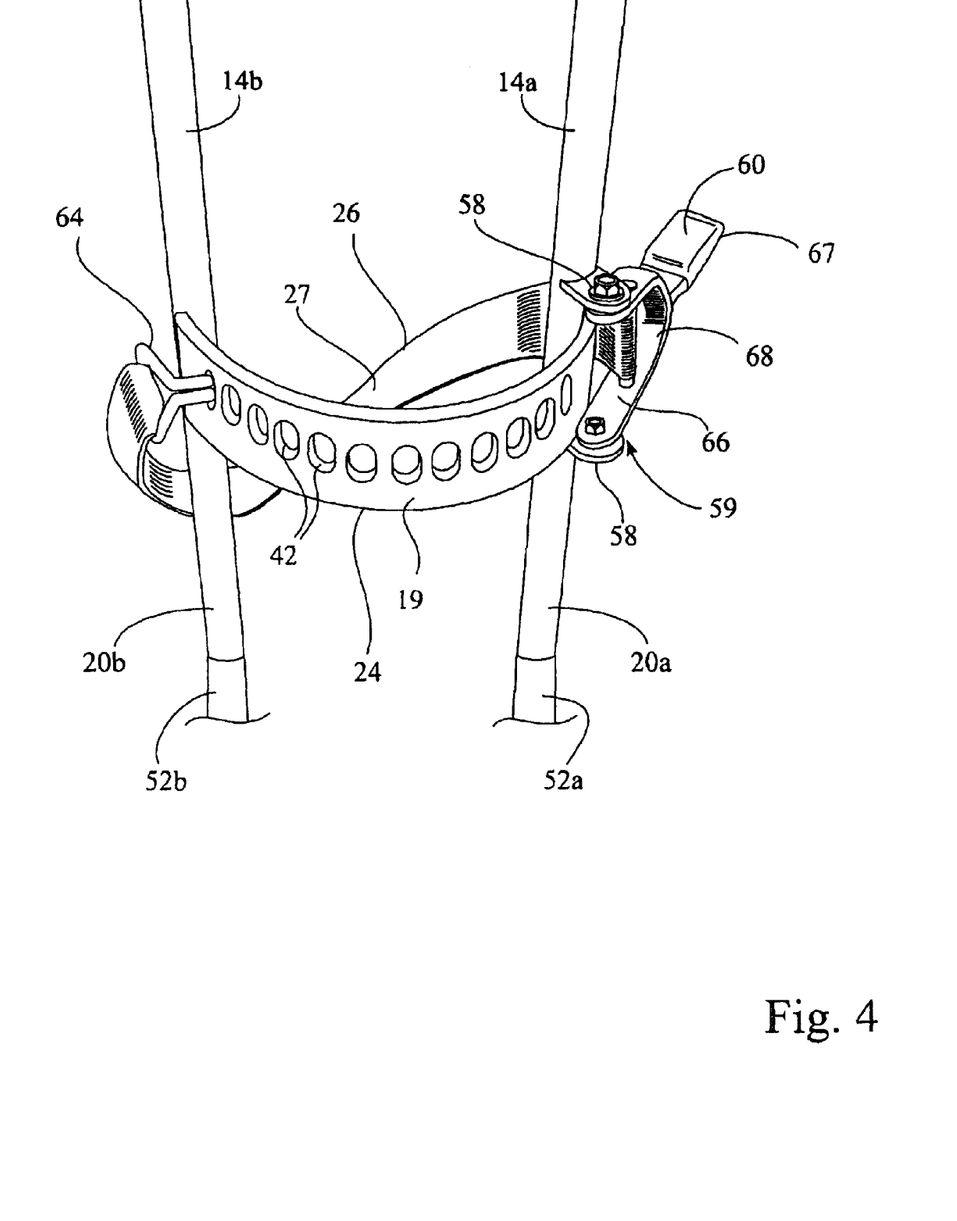
FIG. 4 is a close up of a rear view of the lower cross member and securing mechanism having the tightening handle of the dolly in an unlatched position as shown in FIG. 1.
Figure 5:
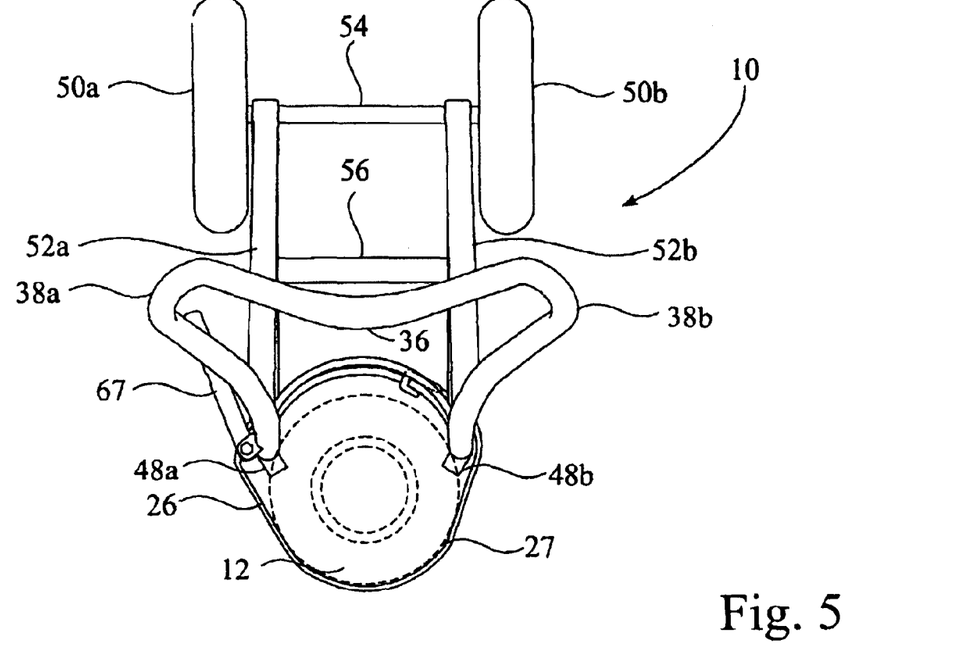
FIG. 5 is a top view of the dolly depicted in FIG. 1.
Figure 6:
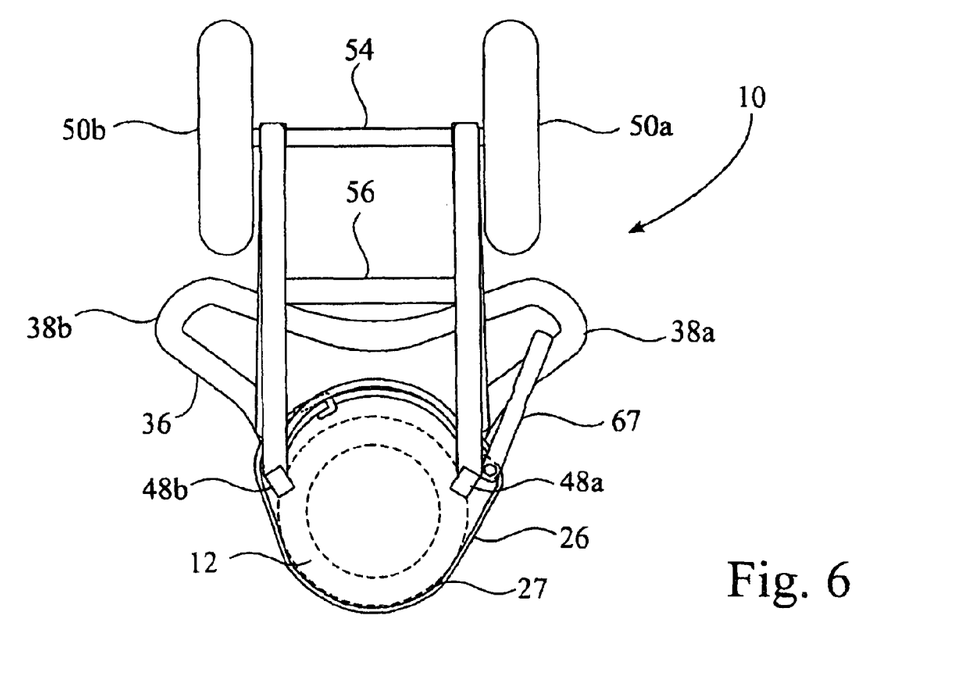
FIG. 6 is a bottom view of the dolly depicted in FIG. 1.
Figure 7:
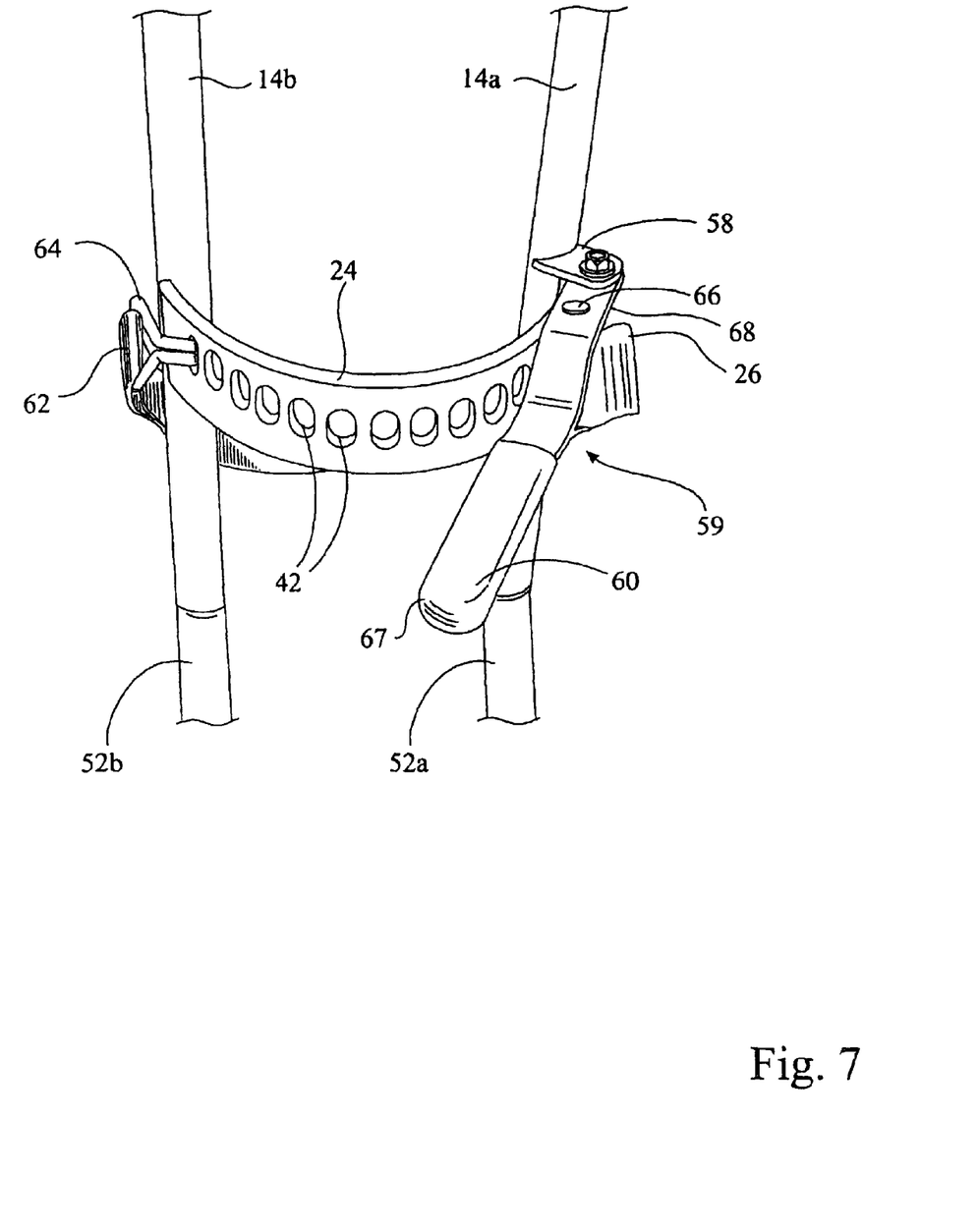
FIG. 7 is a same view as shown in FIG. 4 with the tightening handle in a latched position.

Referring now to FIGS. 4 and 7, a securing device 59 is used to secure the cylinder 12 to the dolly 10 during transportation. The securing device 59 includes the restraining strap 26, anchor bracket 58, and tightening handle 60. The restraining strap is preferably formed of a nylon material and constructed similarly to a vehicle seat beat. The strap is formed with a free end 62 having a loop securing a hook 64 that is dimensioned to be partially received in any of the holes 42 in the lower cross member 24. The other end of the strap 26 includes a loop that is fastened to an anchoring pin 66 captured by the tightening handle 60. The anchor bracket is welded to the one of the vertical support members 14a and includes a pair of flanges with bolt holes. The tightening handle includes a gripping region 67 and a forked section 68 which is bolted to the anchor bracket. The anchoring pin is captured in the forked section and secures one end of the strap 26. The tightening handle may be pivoted toward the front and rear of the dolly 10. The forward position is typically called the unlatched position as illustrated in FIG. 4. The rear position is typically called the latched or secure position where the handle is frictionally retained as illustrated in FIG. 7. A strap of around 23 inches in length has been found to accommodate most sizes of welding cylinders.

Figure 8:
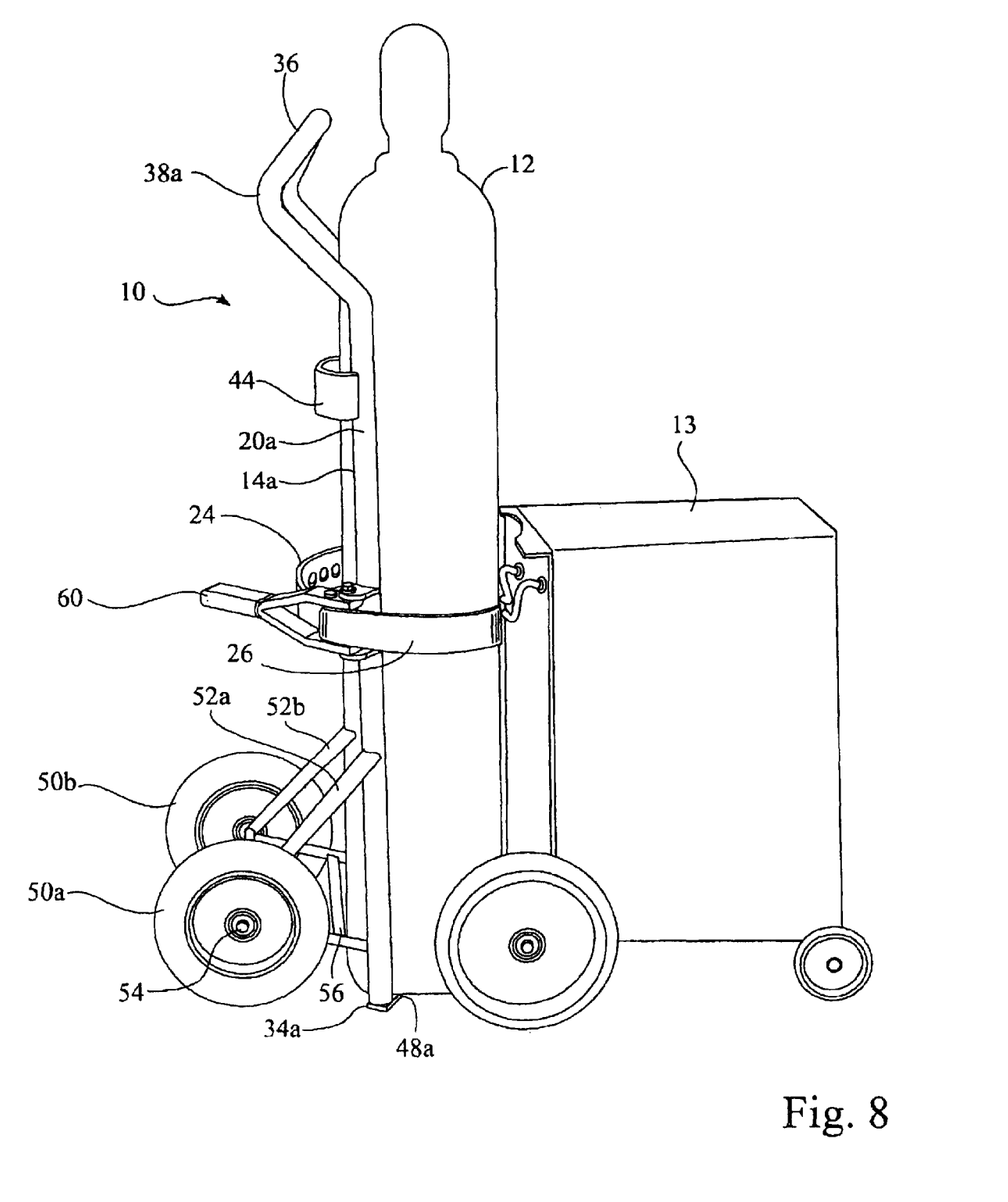
FIG. 8 is a forward perspective view of the present invention as depicted in FIG. 1 preparing to load and transport a welding cylinder from a welding cart.
Figure 9:
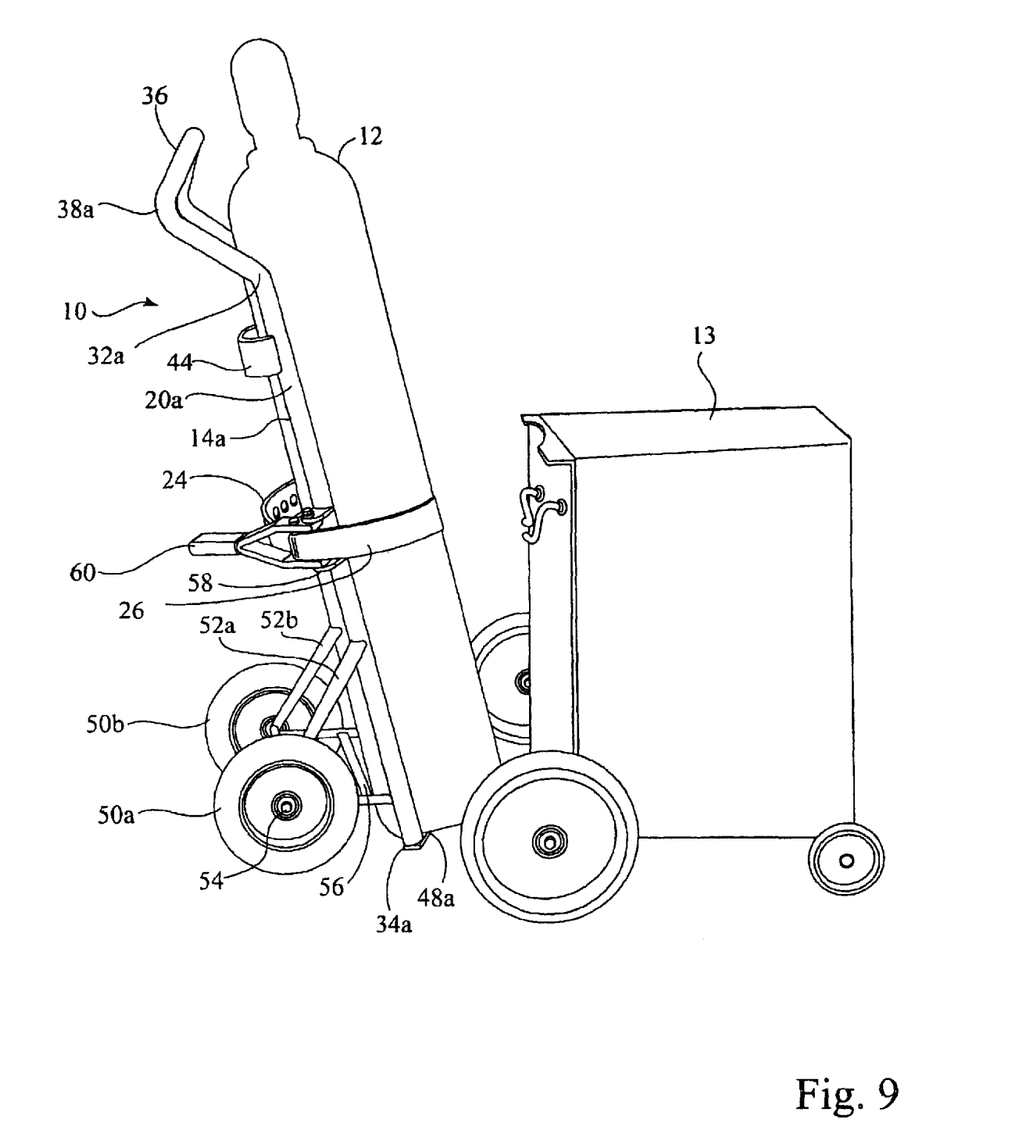
FIG. 9 is a view of dolly depicted in FIG. 8 with the welding cylinder in a supported position.
Figure 10:
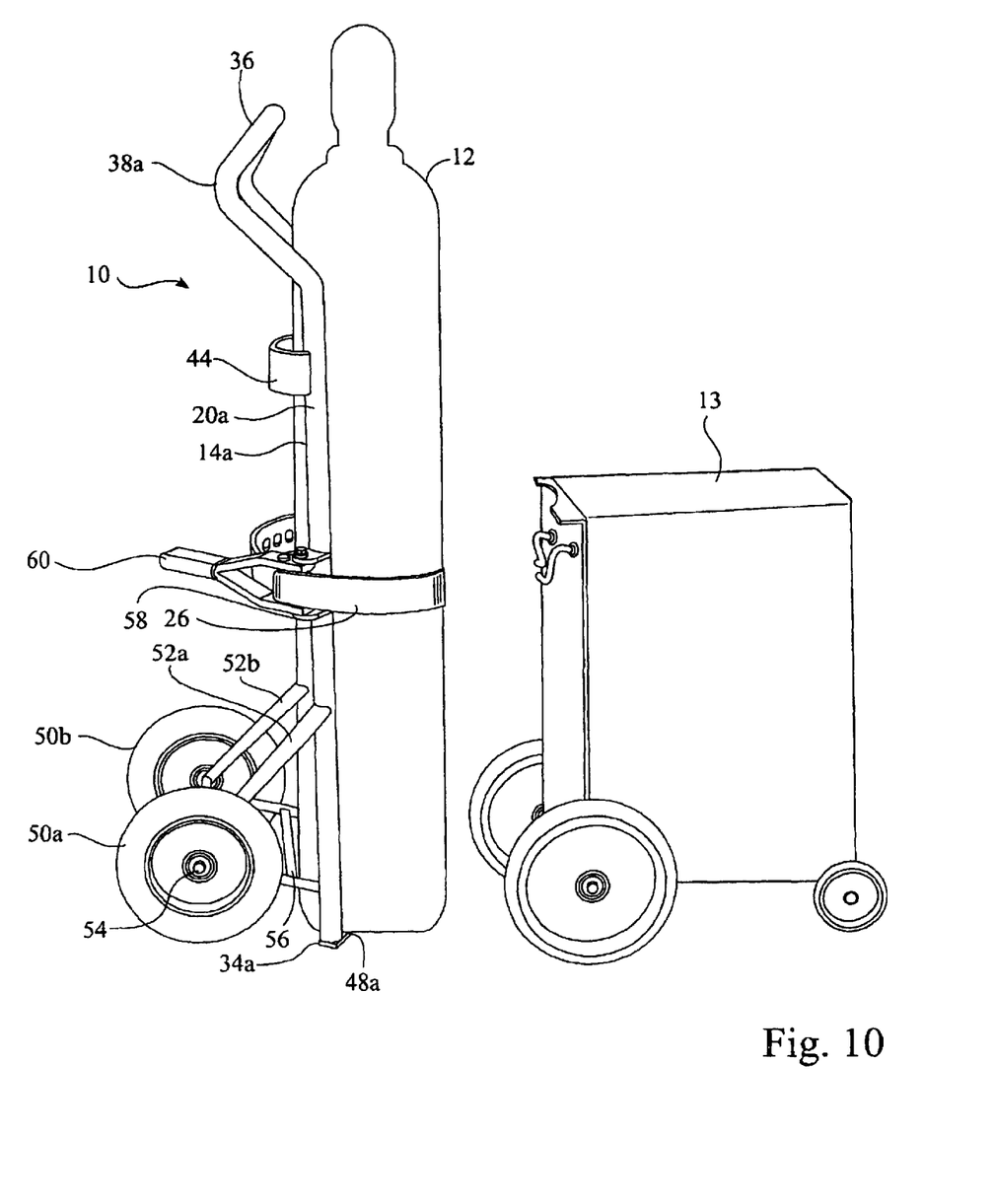
FIG. 10 is a view of the dolly in FIG. 8 with the welding cylinder in a position to be unloaded.

In operation, and referring now to FIGS. 8–10, it will be assumed that the dolly 10 is initially loaded (FIG. 8) with a cylindrical object 12 and in position abutting a welding cart 13. To transport the cylindrical object 12, the handler may simply grasp the handle 36 by the wings 40a, 40b and put one foot on the axle 54 to pivot the dolly 10 rearwardly thereby raising the front end of the cylinder off the underlying surface and clearing the feet 34a, 34b as well (FIG. 9). The handler may then pull or push the dolly to a new location and set the cylinder down by allowing the dolly to pivot forwardly on its wheels until the bottom surface 49 of the cylinder 12 is flush and in contact with the ground surface (FIG. 10).

On the other, if the dolly 10 is initially unloaded, the handler grasps the handle 36 of the dolly 10 and pivots the dolly on its wheels 50a, 50b until the flanges 34a, 34b of the vertical support members 14a, 14b are clear of the surface upon which the dolly is to be transported over. The dolly 10 may then be wheeled next to a cylindrical object such as a welding cylindrical 12 or other compressed gas container (FIG. 10). The hook 64 on the free end 62 of the strap 26 is removed from one of the holes 42 in the lower cross member 24 and left to hang by the side of the dolly. The handler then positions the vertical support members 14a, 14b such that the cylinder 12 is substantially centered and the flanges 34a, 34b abut the bottom edge of the cylinder. Then the dolly is driven into contact with the cylinder such that the forward facing contact surfaces 20a, 20b abut the cylinder. Due to the curvature of the cross members 24 and 44 and the spacing of the vertical support members 14a, 14b, the cylinder will not contact the cross members because of their respective clearance gaps formed by the central regions 19 and 45. The tightening handle 60 is placed in the release or unlatched position (FIG. 4) and the cylinder is substantially encircled with the strap 26 with the interior surface 27 resting against the cylinder. The handler may then gauge the proper hole 42 to place the hook 64 within and secures the free end 62 of the strap 26 to the lower cross member 24. The strap is checked to make sure it is not twisted in any manner. The handler then grasps the gripping region 66 of the tightening handle 60 and pulls it rearwardly to the latched position (FIG. 7). The strap is checked and if there is any slack, the strap may be adjusted by releasing the tightening handle 60 and repositioning the hook 64 in one of holes 42 next to the hole just used. The tightening handle is then resecured in the latched position. This process should be repeated until the strap is tightly drawn across the cylinder's outer circumference thereby forming the "friction sandwich" holding the cylinder between the contact surfaces 20a, 20b, and 27. The handler may then transport the dolly and cylinder as described herein above.

It will be appreciated that the absence of a noseplate facilitates closer placement of the dolly 10 adjacent to the cylinder 12 because there is no need to tip the cylinder forward or lean it over to drive the noseplate underneath. Thus, the dolly 10 described herein promotes safety because the handler does not risk tilting a heavy cylinder possibly resulting in dropping the cylinder. In addition, the handler reduces the risk of back injury from avoiding lifting or sliding the cylinder 12 onto a noseplate. The short fail-safe feet 48a, 48b allow a handler to place the vertical support members 14a, 14b, right up against the cylinder to be transported. The tightening of the strap 26 will pull the cylinder up onto the fail safe feet 48a, 48b providing an additional safety feature by supporting the bottom of the cylinder 12.

A cable or chain may be used in place of a strap 26 provided the chain or cable is adjustable and may be tightened sufficiently to cooperate with the vertical support members in supporting the cylinder 12 on the dolly 10 during transportation.

While the placement of the holes on the lower cross member 24, the spacing of the vertical support members 14a, 14b, and the length of the strap 26 have been found to accommodate most cylindrical objects, the use of the one piece tubing and semi-circular brackets has been found to provide an additional benefit of sufficient flexibility to accommodate those cylindrical objects having an odd-sized diameter. The latching handle 60, mounting bracket 58, and strap 26 are selected to provide sufficient leverage to cause the frame to flex inwardly enough to accommodate an odd-sized dimension cylinder in a secure manner.

While several forms of the present invention have been illustrated and described, it will also be apparent that various modifications may be made without departing from the spirit and scope of the invention. Furthermore, while the preferred embodiment of the invention has been described in terms of the dimensions and cross-sectional configurations of various components of the invention it is understood that the invention is not intended to be limited to those specific dimensions or configurations but is to be accorded the full breadth and scope of the claims appended hereto.

What is claimed is:

1. A dolly for carrying elongated cylindrical objects comprising:
    a first vertical support member;
    a second vertical support member spaced apart in a parallel relationship from said first vertical support member;
    each of said vertical support members including a top end, an intermediate section, and a bottom end, said respective intermediate sections cooperating to form a first contact surface;
    at least one elongated cross member predetermined width joining said first and second vertical support members to one another within said intermediate section, said cross member having a central region spaced rearwardly of a plane passing through said vertical support members so as to form a clearance gap between said cross member and said cylindrical object when said cylindrical object is against said first contact surface;
    an adjustable restraining strap dimensioned in length to substantially encircle said cylindrical object and having an interior side forming a second contact surface, said strap further including a free end having an attachment member for attaching to a first end of said cross member and an anchoring end attached to an opposing end of said cross member for being drawn into a tightened configuration;
    a pair of wheels rotatably coupled to said vertical support members; and
    whereby said first contact surface of said dolly may be placed against said cylindrical object and upon tightening said adjustable strap around said cylindrical object, said cylindrical object is sandwiched between said first and second contact surfaces and spaced apart from said cross member such that said dolly may be tilted toward a handler and wheeled along with said object contacting only said first and second contact surfaces.

2. The dolly as set forth in claim 1 wherein:
    each vertical support member includes a fail-safe flange projecting inwardly from its respective said bottom end and normally spaced below and apart from a bottom edge of said cylindrical object when said cylindrical object is restrained between said contact surfaces on said dolly to inhibit downward movement along said vertical support members of said cylindrical object when said cylindrical object is not restrained between said contact surfaces.

3. The dolly as set forth in claim 1 wherein:
    a handle section extends from the top end of the vertical support members.

4. The dolly as set forth in claim 1 wherein:
    a support bracket projects rearwardly from said vertical support members to rotatably mount an axle from which said wheels are mounted.

5. The dolly as set forth in claim 1 further including:
    a locking handle configured to receive said anchoring end of said strap to tighten the strap around the object.

6. The dolly as set forth in claim 1 wherein:
    said first and second vertical support members are equal in length and diameter.

7. The dolly as set forth in claim 1 wherein:
    said cross member is substantially C shaped.

8. The dolly as set forth in claim 1 wherein:
    said cross member is joined to said vertical support members at right angles.

9. A dolly as set forth in claim 1 wherein:
    said vertical support members are between 36 and 48 inches in height.

10. The dolly as set forth in claim 2 wherein:
    said flanges extend inwardly at right angles to said bottom end of said vertical support members.

11. The dolly as set forth in claim 2 wherein:
    said flanges extend inwardly and forwardly of a plane passing through said vertical support members.

12. The dolly as set forth in claim 1 wherein:
    said cross member is welded onto said vertical support members.

13. The dolly as set forth in claim 1 wherein:
    said intermediate sections are cylindrical and said first contact surface is curved.

14. The dolly as set forth in claim 1 wherein:
    said vertical support members are spaced apart approximately 7 inches off center.

15. The dolly as set forth in claim 1 wherein:
    said cross member includes eleven holes spaced three quarters of an inch off center.

16. The dolly as set forth in claim 1 wherein:
    said support contact surface is powder coat.

17. The dolly as set forth in claim 3 wherein:
    said handle projects outwardly away from a centerline projecting between said vertical supports and rearwardly from said respective top ends and turns inwardly and forwardly to form a pair of opposing handle wings terminating in outwardly distal gripping elbows.

18. The dolly as set forth in claim 1 wherein:
    said cross member is flexible such that said vertical support members may be drawn closer than said predetermined width as said adjustment strap is tightened about said cylindrical object.

19. A dolly for carrying elongated cylindrical objects comprising:
    a frame including a pair of vertical support members, each support member including a tubular intermediate section forming a first contact surface;
    at least one elongated flexible cross member joining said first and second vertical support members to one another within said intermediate section, said cross member having a central region spaced rearwardly of a plane passing through said vertical support members so as to form a clearance gap between said cross member and said cylindrical object when said cylindrical object abuts said first contact surface;

an adjustable restraining strap dimensioned in length to substantially encircle said cylindrical object and having an interior side forming a second contact surface, said strap further including a free end having an attachment member for attaching to a first end of said cross member and an anchoring end attached to an opposing end of said cross member for being drawn into a tightened configuration;

a pair of wheels rotatably coupled to said vertical support members; and whereby said cylindrical object may be seated against said first contact surface of said dolly and upon tightened said adjustable strap around said cylindrical object, said cylindrical object is sandwiched between said first and second contact surfaces and spaced apart from said cross member such that said dolly may be tilted toward a handler and wheeled along with said object contacting only said first and second contact surfaces.

* * * * *